Figure 3:
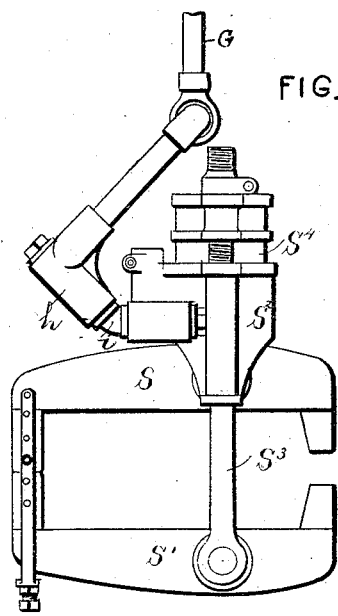

(No Model.) 4 Sheets—Sheet 1.
R. H. TWEDDELL, J. PLATT & J. FIELDING.
PORTABLE RIVETING MACHINE.
No. 307,352. Patented Oct. 28, 1884.
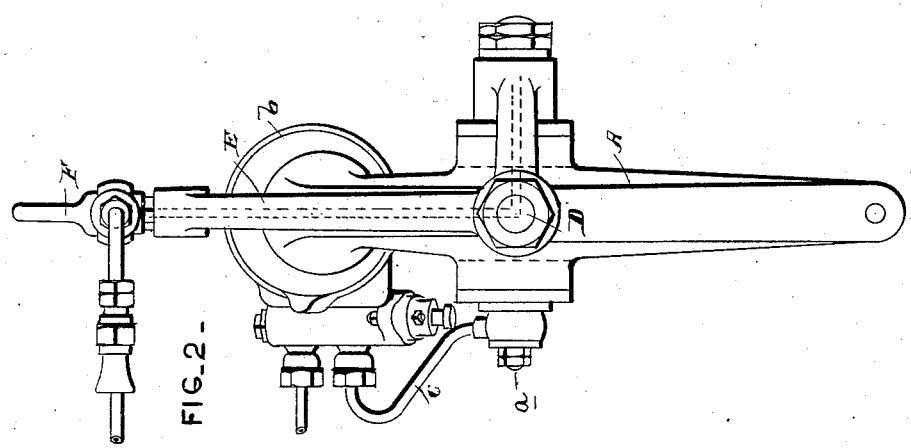
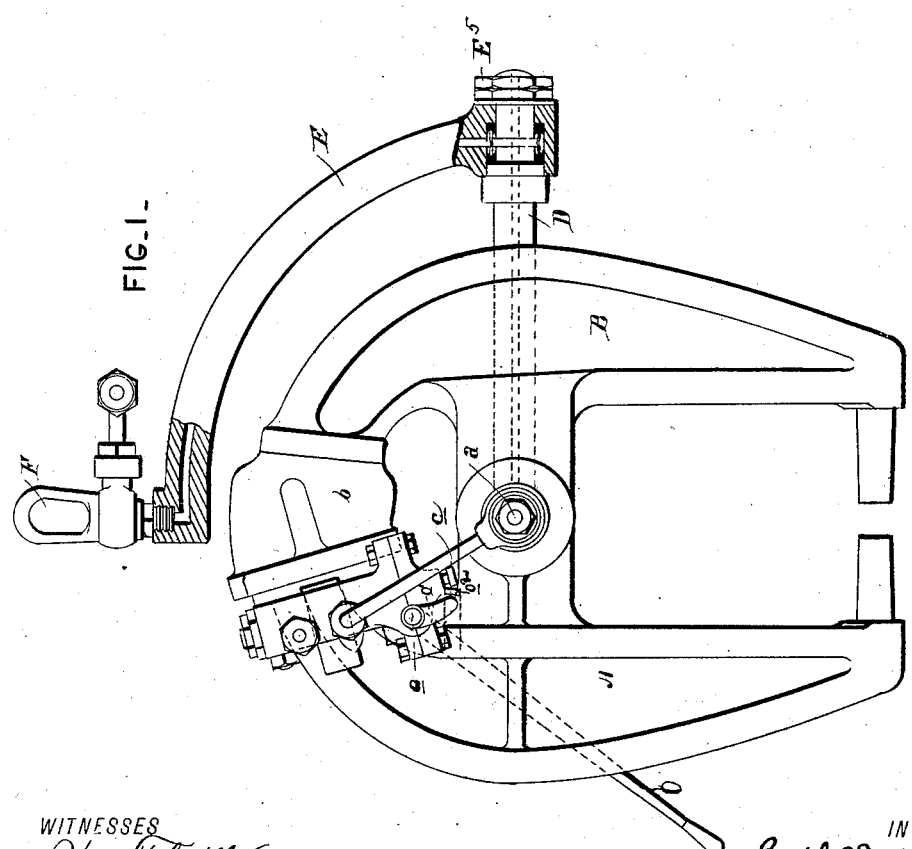
WITNESSES
Wm. T. Gill
Geo. F. Downing,
INVENTORS.
Ralph Hart Tweddell
James Platt
John Fielding.
By H. A. Seymour ATTORNEY (No Model.) 4 Sheets—Sheet 2.

R. H. TWEDDELL, J. PLATT & J. FIELDING.
PORTABLE RIVETING MACHINE.

No. 307,352. Patented Oct. 28, 1884.

WITNESSES
Wm. T. Gill
Geo. F. Downing.

INVENTORS
Ralph Hart Tweddell
James Platt
John Fielding
By H. A. Seymour ATTORNEY

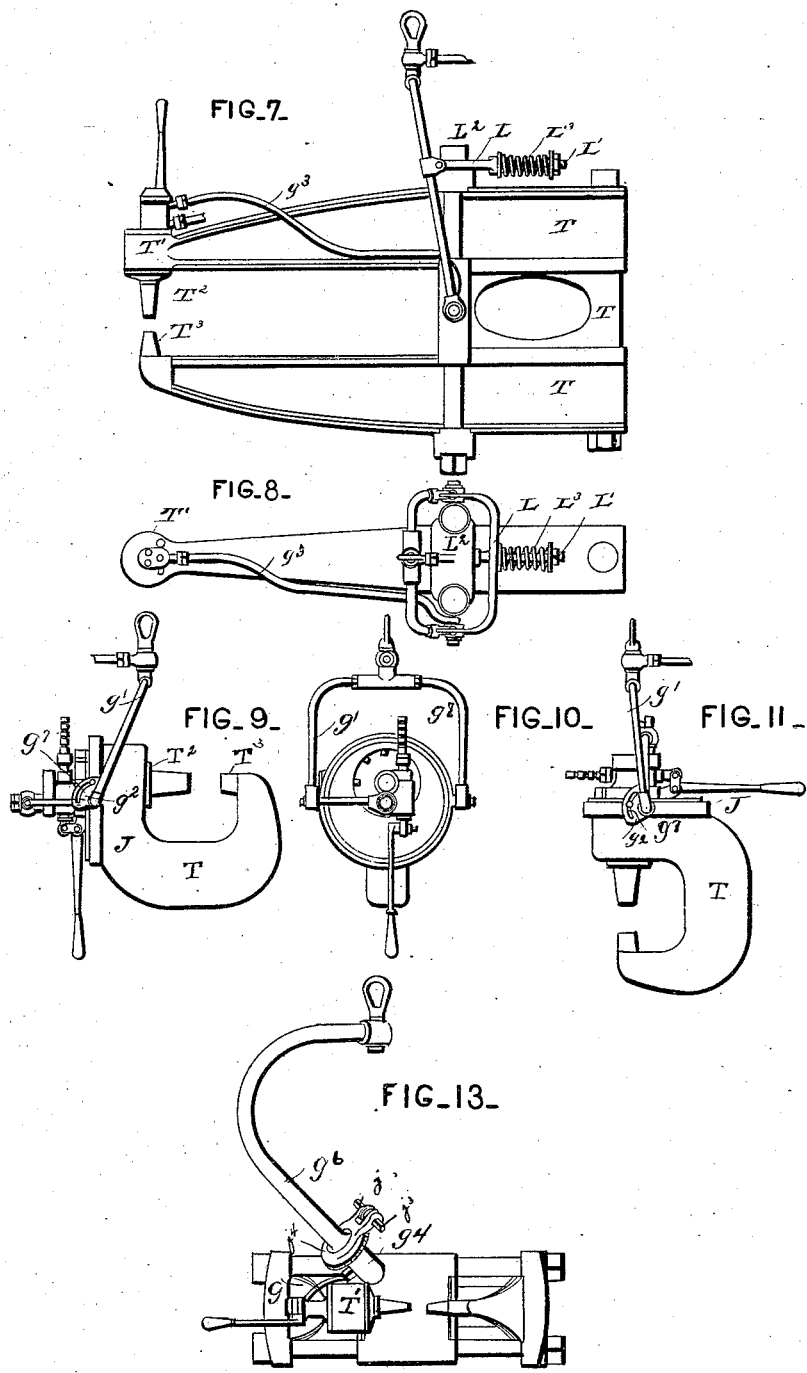

(No Model.) 4 Sheets—Sheet 4.
R. H. TWEDDELL, J. PLATT & J. FIELDING.
PORTABLE RIVETING MACHINE.
No. 307,352. Patented Oct. 28, 1884.
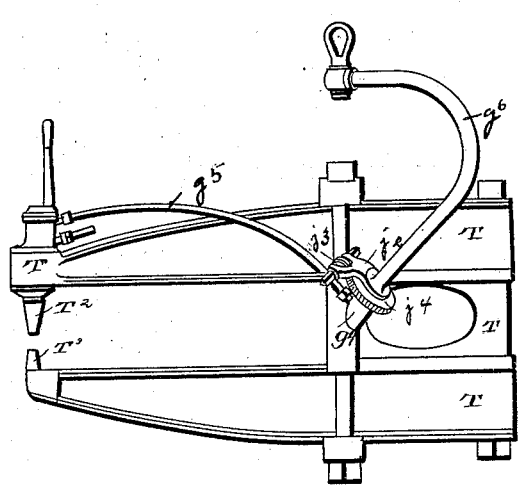
FIG_12_
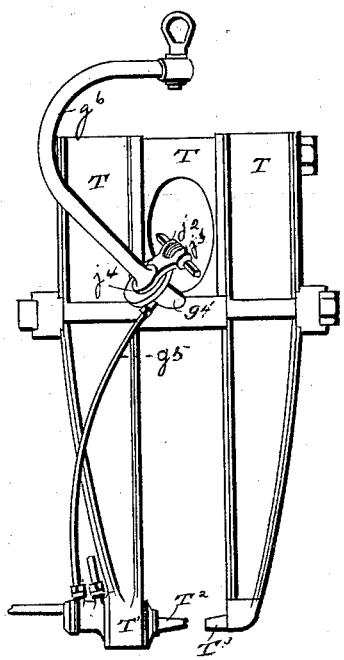
FIG_14_
WITNESSES
Wm T Gill.
Geo. F. Downing.
INVENTORS
Ralph Hart Tweddell
James Platt
John Fielding
By H. A. Seymour ATTORNEY

UNITED STATES PATENT OFFICE.

RALPH HART TWEDDELL, OF WESTMINSTER, COUNTY OF MIDDLESEX, AND JAMES PLATT AND JOHN FIELDING, OF GLOUCESTER, COUNTY OF GLOUCESTER, ENGLAND.

PORTABLE RIVETING-MACHINE.

SPECIFICATION forming part of Letters Patent No. 307,352, dated October 28, 1884.

Application filed June 16, 1884. (No model.) Patented in England February 27, 1878, No. 797; in France September 7, 1878, No. 127,589, and in Belgium October 7, 1878, No. 46,325.

*To all whom it may concern:*

Be it known that we, RALPH HART TWEDDELL, of Westminster, in the county of Middlesex, and JAMES PLATT and JOHN FIELDING, of Gloucester, in the county of Gloucester, and country of England, have invented certain new and useful Improvements in Portable Riveting-Machines; and we do hereby declare the following to be a full, clear, and exact description of the invention, such as will enable others skilled in the art to which it appertains to make and use the same.

Our invention relates to an improvement in portable riveting-machines, the object of the same being to provide simple and efficient means for adjusting the machines to any desired angle; and it consists in suspending them by means of their supply or discharge pipes, so jointed and swiveled that the attitude of the machine may be varied as desired, to suit the work to which they are applied.

In the accompanying drawings, Figure 1 is a view in side elevation of one form of portable riveting-machine, showing our improvement applied thereto. Fig. 2 is an end view of the same, and Figs. 3 to 14, inclusive, show slightly modified constructions.

A and B represent the levers of a portable riveting-machine pivoted together by trunnion $a$, one of the said levers being provided with a cylinder, $b$, while the adjacent end of the opposite lever is provided with a plunger, which latter moves in the cylinder. The trunnion $a$ is hollow, and connected by a swivel-joint to the pipe $c$, the opposite end of which is in communication with the valve, the box of which is rigidly secured to the cylinder. The trunnion $a$ is secured to or formed integral with the arm D, which latter is also provided with a central bore, forming a water-passage, which communicates by a packed swivel-joint with the lower end of the curved supporting-arm E, which latter is also provided with a central bore for the passage of the actuating-fluid. This arm E terminates over the center of gravity of the machine, and is provided at its upper end with a swivel hook or link, F, by means of which the machine is suspended. This machine is adapted to be turned on its trunnion, and the arm D is adapted to turn in the bearing in the lower end of the supporting-arm E to enable the riveting mechanism to be turned to any desired angle or inclination to suit the work to be performed. The arms D and E can be clamped together so as to hold the riveter in any desired adjustment by the nuts $E^5$; or a worm and worm-wheel can be employed for the same purpose. The arm E is connected to a suitable flexible pipe, while the swivel F is connected to a chain depending from a traveling crane. Thus it will be seen that the working fluid passes through the flexible pipe into the arm E, and from thence through the arm D, through the trunnion $a$ and pipe $c$ into the valve-chamber. After the water has been used in the cylinder C it is discharged through a suitable flexible pipe.

In Figs. 3, 4, 5, and 6 we have shown our combined supply and suspending pipe attached to a modified form of riveter. In this riveter two levers, S S', are pivoted together at their rear ends, the upper or inner lever, S, being pivotally or otherwise secured to the cylinder $S^2$, while the lower or outer lever, S', is pivotally attached to the rods $S^3$. These rods pass through sleeves in the side of the cylinder $S^2$, and are adjustably connected at their upper ends to the plunger $S^4$.

Figure 4:
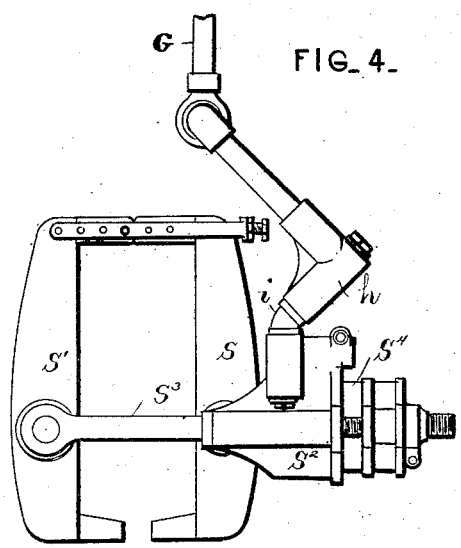

In Figs. 3 and 4 the arms D and E (shown in Figs. 1 and 2,) are dispensed with, and the riveter suspended from a single supply-pipe alone. This supply-pipe is made up of four sections, as shown, and is connected at its upper end to the pipe G.

In Fig. 3 the levers S and S' are shown in horizontal position, and by simply turning the elbow $h$ on the curved section $i$ the said levers can be turned to a vertical or any other desired position.

Figure 5:
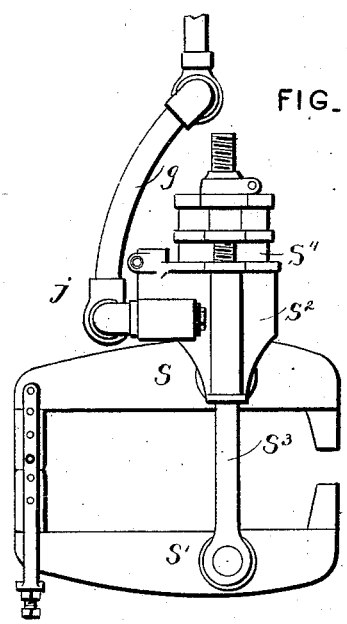
Figure 6:
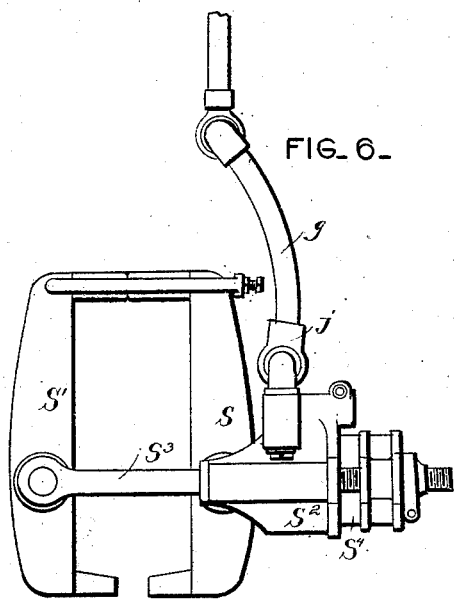

In Figs. 5 and 6 we dispense with the elbow-connection $h$, and secure the single pipes $g$ to the curved elbow $j$. By simply loosening the connection between the pipe $g$ and the elbow $j$, the levers can be turned from the position shown in Fig. 6 to any other angle necessary.

In Figs. 7, 8, 9, 10, 11, 12, 13, and 14 another construction of riveter is shown in connection with the hollow suspending-pipes. This riveter consists, essentially, of the rigid frame T, one arm of said frame being provided with a cylinder, T', in which the plunger T² moves, and the other arm being provided with a holding-up tool, T³.

In Figs. 9, 10, and 11 the riveter is suspended from a bail consisting of a pipe, $g'$, and an arm, $g^8$, which simply assists in supporting the riveter. In these figures the bail is provided on one or both sides with the segmental plate $g^2$, each of which latter is provided with an elongated slot, $g^7$, formed concentric to the axis of the bail. A set-screw passes through this slot and enters the riveter, and the head thereof bears against the plate $g^2$. By means of this slot and screw, the riveter can be adjusted to numerous different positions to suit different kinds of work.

In Figs. 7 and 8 the bail is suitably trunnioned to the riveter at a point between the levers, and is provided with the branch pipe $g^3$, which conveys the water from the hollow arm of the bail to the cylinder T'. The bail is provided, about midway its length, with the stirrup L, which latter is perforated centrally for the passage of the rod L', the inner end of which is secured to the abutment L² of the riveter. The outer end of the rod L is headed, and a strong spiral spring, L³, is interposed between the outer face of the stirrup and the head of the bolt. Thus it will be seen that the riveter is retained in its horizontal position, and any movement, weight, or pressure tending to change the inclination of the levers, instead of suddenly straining and probably injuring the parts, is taken up by the spiral spring, which latter allows the levers to yield and causes them to regain their normal position after the pressure is relieved.

This style of riveter is also applicable in connection with a single supporting-tube, as shown in Figs. 12, 13, and 14, which latter, instead of employing several joints in the supporting-pipe, as in Figs. 3 and 4, employs simply a single joint working in an oblique hollow arm. In this instance the bent supply-pipe $g^6$ works in the hollow arm $g^4$, which latter communicates with the cylinder T' by the pipe $g^5$. The pipe $g^6$ is provided with the brackets $j^2$, in which the worm-shaft $j^3$ is journaled. This shaft meshes with the worm-wheel $j^4$ of the hollow arm $g^4$, and is provided with an angular end to enable a key to be placed thereon. Thus it will be seen that by simply turning the worm-shaft the riveter can be adjusted to any desired position or inclination to accommodate itself to the work.

In Figs. 1 and 2 we have shown the valve whereby the flow of water to the cylinder is cut off. The valve-box is provided with a longitudinally-sliding valve operated by the shaft $o$, which latter passes through the lower end of the valve-box. This shaft is provided at one end with a hand-lever, O, by which it is operated, and at its opposite end with a projecting finger, $o'$, which latter, when the plunger of the lever A is near the end of its outer stroke, comes in contact with the laterally-projecting abutment $o^2$, rigidly secured to the lever A, and turns the shaft $o$, which in turn moves the valve a sufficient distance to cut off the supply of water to the cylinder $b$, and opens the exhaust.

We make no claim in this application to suspending and supply pipes which are also employed for elevating the riveter, nor to the worm and worm-wheel for varying the position of the riveter, nor to the automatic mechanism for shifting the valves, as these features are shown, described, and claimed in pending cases numbered, respectively, 131,314, 128,530, and 135,571.

Having fully described our invention, what we claim as new, and desire to secure by Letters Patent, is—

1. The combination of a portable riveting-machine and a combined supply-pipe and suspending device trunnioned to the riveter, substantially as set forth.

2. The combination of a portable riveting-machine, a combined supply-pipe and suspending device trunnioned to the riveter, and the devices for locking the suspending pipes and riveter in any desired adjustment.

3. The combination of a portable riveting-machine, a combined supply-pipe and suspending device trunnioned to the riveter, a branch-pipe leading from the supply-pipe to the cylinder, and a swiveled hook secured to the upper end of the supply-pipe and suspending device, substantially as set forth.

4. The combination of a portable riveting-machine, a combined supply and supporting pipe, a branch-pipe connecting the supply-pipe with the cylinder, and a swiveled link secured to the upper end of the supply-pipe, substantially as set forth.

5. The combination of a portable riveting-machine, a pipe, $g'$, link $g^3$, swiveled hook, and branch pipe connecting the pipe $g'$ with the cylinder of the riveting-machine, substantially as set forth.

6. The combination of a portable riveting-machine, the pipe $g'$, link $g^8$, and pipe connecting pipe $g'$ with the cylinder of the riveting-machine, and the set-screw for adjusting the riveter relative to the bail formed by the pipe and link, substantially as set forth.

In testimony whereof I have signed this specification in the presence of two subscribing witnesses.

RALPH HART TWEDDELL.

Witnesses:
  H. G. SCOTT,
  WM. BAILEY.

In testimony whereof we have signed this specification in the presence of two subscribing witnesses.

JAMES PLATT.
    JOHN FIELDING.

Witnesses:
  JOHN A. POPE,
  H. CADENNE.